Jan. 20, 1925.

M. M. MUELLER 1,523,705

TRANSMISSION LOCK

Filed Dec. 7, 1922

Inventor:
Max M. Mueller
By Milo B. Stevens Co.
Attorneys

Patented Jan. 20, 1925.

1,523,705

UNITED STATES PATENT OFFICE

MAX M. MUELLER, OF CHICAGO, ILLINOIS.

TRANSMISSION LOCK.

Application filed December 7, 1922. Serial No. 605,463.

*To all whom it may concern:*

Be it known that I, MAX M. MUELLER, a citizen of the United States, residing at Chicago, in the county of Cook and State of Illinois, have invented new and useful Improvements in Transmission Locks, of which the following is a specification.

This invention relates to mechanism for preventing the theft and unauthorized use of motor vehicles, and more particularly a mechanism of this kind which functions by locking the transmission. The mechanism has been designed for application to a motor vehicle transmission of the planetary type, and the invention has for its object to provide a transmission lock of this kind embodying certain novel and improved features of construction and modes of operation to be hereinafter described and claimed.

In order that the invention may be better understood, reference is had to the accompanying drawings, wherein, Figure 1 is an elevation, partly in section, of the transmission, showing the lock applied thereto;

Figure 1:
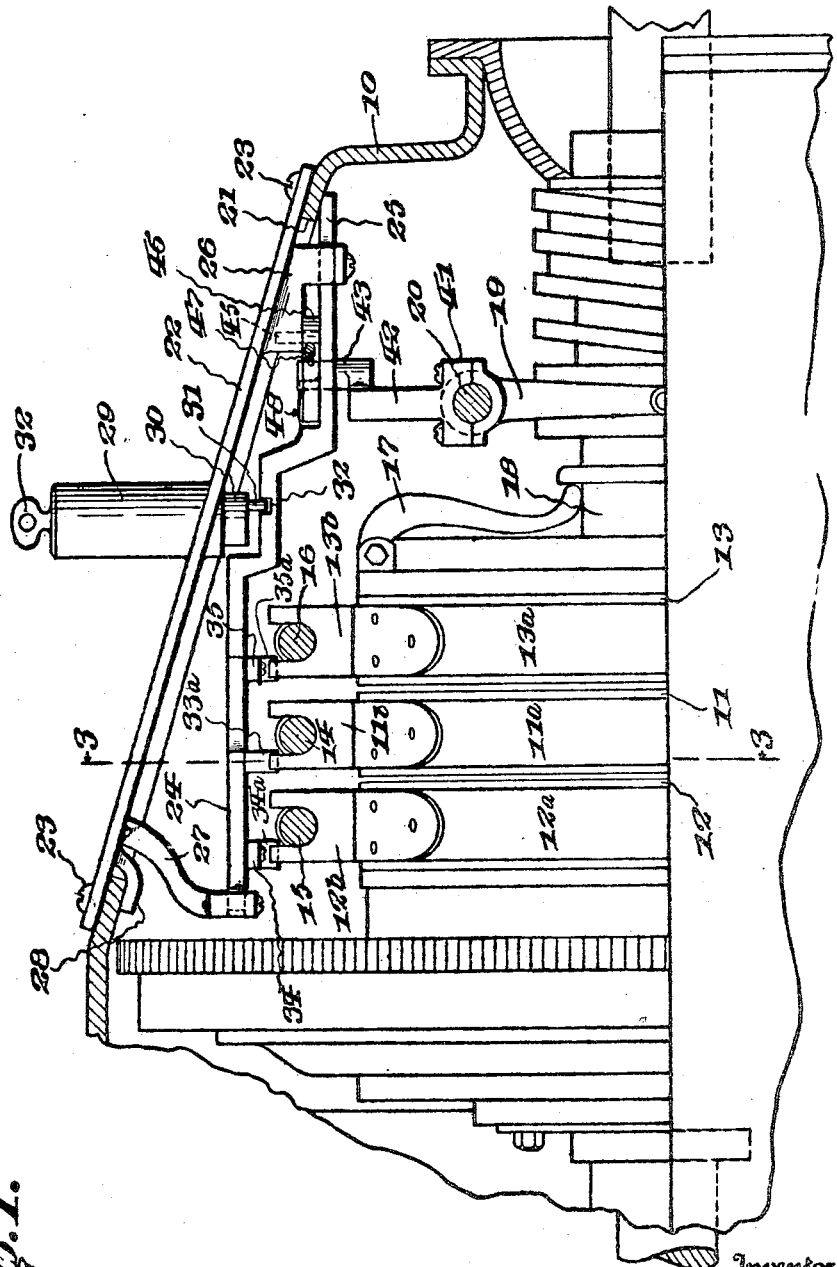
Figure 2:
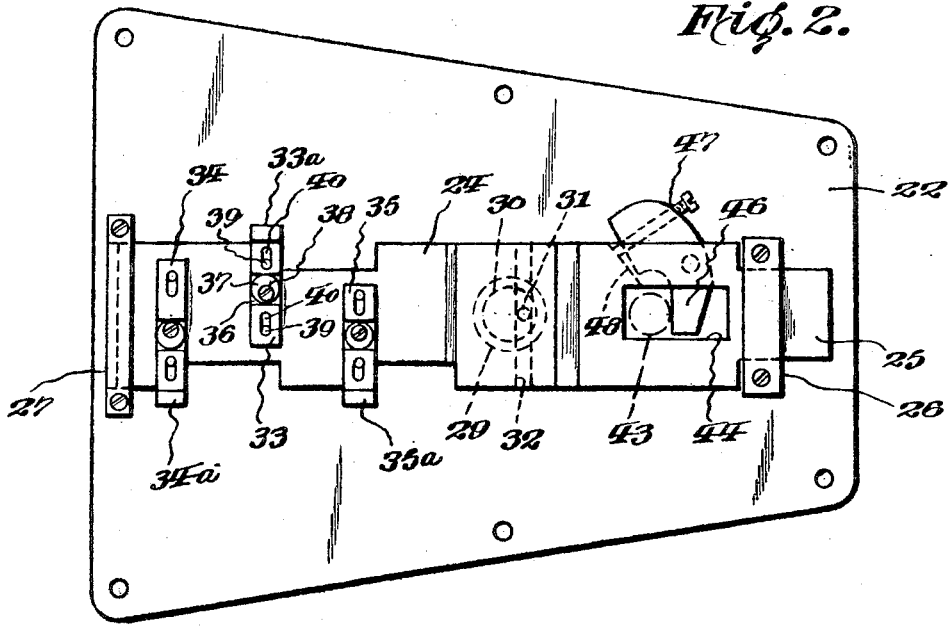
Fig. 2 is an inverted plan view of the lock removed.

Referring specifically to the drawings, 10 denotes the housing which encloses the planetary transmission mechanism to which the invention is applied, this mechanism being of the well known "Ford" type. The low speed drum is shown at 11, the reverse drum at 12 and the brake drum at 13, and the bands associated with these drums are shown at 11$^a$, 12$^a$, and 13$^a$, respectively. The ends of the bands are provided with ears 11$^b$, 12$^b$ and 13$^b$ for the actuating shafts 14, 15 and 16 of the bands. It will be understood that the low speed drive is obtained by tightening the band 11$^a$ around its drum 11, and the reverse by tightening the band 12$^a$ around its drum 12, and hence if a means is provided to prevent this operation of the bands, the low speed and reverse drives cannot be obtained. The invention consists of a mechanism for blocking this operation of the bands 11$^a$ and 12$^a$, as well as the brake band 13$^a$. A means is also provided for holding the clutch in neutral position so that the direct, high speed drive cannot be obtained. The entire clutch has not been illustrated as its structure is well known. It may be stated however, that the clutch is operated by certain clutch fingers, one of which is shown at 17 in Fig. 1, these fingers having an operative connection with a shifter 18 engageable by a release fork 19 carried by a rocker shaft 20. It will be evident that if the shaft 20 is locked after it has been rocked to place the clutch in neutral position, the clutch will be locked in such position.

The mechanism for effecting the locking actions hereinbefore described comprises the following parts:

The top of the housing 10 has an opening 21 which is covered by a detachable plate, which latter, for the purpose of the present invention is dispensed with, and a specially designed closure plate 22 substituted therefor, the same being fastened down in place by screws 23. This plate carries the entire locking mechanism of the bands 11$^a$, 12$^a$ and 13$^a$, and it is provided with a means whereby it is locked to the housing 10 when said bands are locked, thereby preventing the locking mechanism from being tampered with. The locking means for the plate 22 consists of a slidable lock-controlled plate 24 having one of its ends 25 downwardly offset and positioned to come beneath the edge of the opening 21, said end working in a guide 26 depending from the plate 22, and the other end of the plate 24 working in a similar guide 27. The last-mentioned end of the plate 24 has a depending hook-like finger 28 which comes beneath the edge of the opening 21. With the plate 24 positioned as described and shown in Fig. 1, the cover plate or closure 22 cannot be removed.

The lock consists of a housing 29 rising from the top of the plate 22, and enclosing a rotatable tumbler 30 which protrudes from the bottom of the plate and has an eccentrically positioned, depending pin 31 seating in a transverse slot in the top of the plate 24. Thus, when the proper key 32 is inserted into the lock, the tumbler may be rotated to slide the plate 24 in the direction of its length, the key being insertable into a key hole in that portion of the lock housing 29 which is on the outside of the cover plate 22.

The slidable plate 24, supported in the housing 10 as hereinbefore described, carries, on its under side, locking bars for the bands 11$^a$, 12$^a$ and 13$^a$, said bars being denoted by the reference characters 33, 34 and 35. The bar 33 has a depending lug 33ª at one end, and the bars 34 and 35 have similar end lugs 34ª and 35ª. The locking bar 33 is so positioned that when the plate 24 is slid rearwardly, the lug 33ª engages or comes close to the inner surface of one of the ears 11ᵇ of the band 11ª, and with the lug in this position, it will be evident that the band 11ª cannot be contracted or tightened on the drum 11 to obtain the low speed drive. The lugs 34ª and 35ª operate in a similar manner in connection with the ears 12ᵇ and 13ᵇ to prevent operation of the reverse and the brake bands 12ª and 13ª.

Inasmuch as the spacing of the ears 11ᵇ decreases as the band 11ª is adjusted to take up wear, the locking bar 33 is adjustable transversely of the plate 24. This is done by forming the bar 33 with a transverse groove 36 intermediate its ends and mounting in said groove a disk 37 which is eccentrically positioned on a screw 38 carried by and depending from the plate 24. Rotation of the disk therefore acts to advance or retract the bar 33, and in this manner it is set according to the spacing of the band ears 11ᵇ. After the adjustment is made, the screw 38 is tightened up to lock the bar 33. The plate 24 also has depending guide pins 39 which extend into longitudinal slots 40 in the bar 33. Adjusting means similar to the ones just described are also provided for the bars 34 and 35.

The following means are provided for locking the clutch in neutral position.

On the rocker shaft 20 is fastened a clamp 41 having a lateral arm 42 at the top terminating in an upstanding finger 43 which extends loosely through a longitudinal slot 44 in the plate 24. On the under side of the plate 22 is pivoted, as shown at 45, an angle lever 46 having one end positioned transversely of the plate 24 and its slot 44. The other end of the lever carries an adjustable screw 47 which is adapted to come in contact with a shoulder or other abutment 48 on the plate 24.

Figure 3:
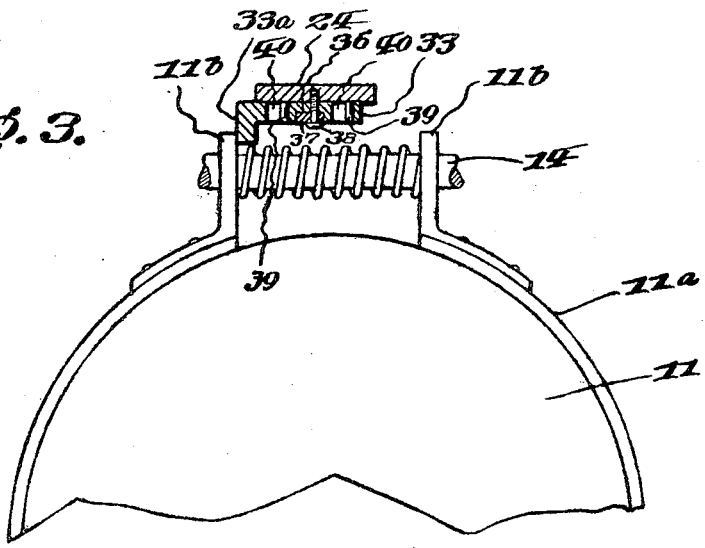
Fig. 3 is a cross-section on the line 3—3 of Fig. 1.

The plate 24 is normally in retracted position so as to leave the lugs 33ª, 34ª and 35ª clear of the band ears 11ᵇ, 12ᵇ and 13ᵇ, and the lever 46 clear of the slot 44 so that it will not interfere with the swing of the finger 43 when the clutch is operated. To lock the transmission, the plate 24 is advanced by the key-operated means hereinbefore described, whereupon the lugs come between the band ears, as shown in Figs. 1 and 3, to block the operation of the bands 11ª, 12ª and 13ª. This movement of the plate 24 also causes the shoulder 48 to bear against the screw 47 and thereby swing the lever 46 so that it pushes against the pin 43 and swings the same to rock the shaft 20 in a direction to place the clutch in neutral position and lock it in that position. In actual practice it will probably be found necessary to assist the movement of the clutch shifter 18 by the pedal which is connected to the shaft 19. The plate 24 also now locks the closure plate 22 to the housing 10, and hence it will be impossible to gain access to the interior of the latter to tamper with the mechanism therein.

I claim:

1. The combination with a transmission case having a detachable cover, of bands within the case, and a locking plate carried by the cover and adapted to directly engage the inner side of the case to lock the cover in position and having means to lock said bands, and a locking plate operated lever for locking the clutch of the transmission.

2. The combination with a transmission case having a cover and a plurality of friction bands and a clutch, of a locking member carried by said cover and having a contact portion, and a clutch locking lever carried by said cover and arranged in the path of travel of the contact portion of said locking member whereby the movement of said locking member results in the operation of said clutch locking lever.

3. The combination with a transmission case having a cover, of a power transmitting mechanism within the case, a locking member slidably carried by the cover and adapted to overlap and engage the case adjacent the cover thereof whereby to secure the cover in position, said locking member being provided with means to lock the transmission bands against operation, a lock carried by the cover for operating said locking member, and a clutch locking member arranged in the path of travel of said locking member and having means to lock the clutch.

4. The combination with a transmission case having a cover, a clutch arm secured in said case and having a projection, bands arranged in the case, a longitudinally movable locking plate carried by said cover and having means to lock the bands, said plate being provided with a slot to receive the projection of said clutch arm, and a locking plate operated lever to engage said projection to hold the clutch against operation.

5. A lock for planetary transmissions comprising a locking member, locking lugs secured thereto and adapted to engage the bands of the transmission and being provided with shoulders, and eccentrically mounted disks engaged with said shoulders and being connected to said locking member, said disks forming a means for adjusting said lugs transversely of the locking member.

6. A transmission lock comprising a longitudinally movable locking member, locking lugs secured thereto and adapted to engage the bands of the transmission and being provided with recesses, the ends of which constitute shoulders, eccentrically mounted disks received in said recesses and engaging said shoulders, said disks being connected to said locking member and being adjustable, and means operated by said locking member for securing the clutch associated with the transmission against operation.

7. The combination with the controlling bands and the clutch of a planetary transmission, a housing inclosing the same, and a cover for said housing; of a lock-controlled slidable member carried by the cover and operable for locking the same, means carried by and operable by said member for engagement with the band ends to block the operation of the bands, said blocking means being adjustable relative to the band ends, and a lever controlled by the slidable member for holding the clutch in neutral position, said slidable member being adapted to directly engage the transmission housing to lock the cover.

8. The combination with the bands and the clutch-control shaft of a planetary transmission; of a lock-controlled slidable member having a slot and a shoulder adjacent thereto, a lever positioned to swing transversely of the slot when engaged by the shoulder, a finger carried by the clutch-control shaft and extending into the slot, and means carried by and operable by the slidable member for engagement with the band ends to block the operation of the bands.

9. The combination with the bands and the clutch-control shaft of a planetary transmission; of a lock-controlled slidable member having a slot and a shoulder adjacent thereto, a lever positioned to swing transversely of the slot when engaged by the shoulder, a finger carried by the clutch-control shaft and extending into the slot, and means carried by and operable by the slidable member for engagement with the band ends to block the operation of the bands, said blocking means being adjustable relative to the band ends.

10. The combination with the bands and the clutch-control shaft of a planetary transmission, a housing enclosing the same, and a cover for the housing; of a lock-controlled slidable member carried by the cover and operable for locking the same, said member having a slot and a shoulder adjacent thereto, a lever carried by the cover and positioned to swing transversely of the slot when engaged by the shoulder, a finger carried by the clutch-control shaft and extending into the slot, and means carried by and operable by the slidable member for engagement with the band ends to block the operation of the bands.

In testimony whereof I affix my signature.

MAX M. MUELLER.